United States Patent [19]

Burt et al.

[11] 4,076,644
[45] Feb. 28, 1978

[54] STORAGE STABILE POLYOL-CHLOROFLUOROALKANE COMPOSITION

[75] Inventors: James Gordon Burt, Oxford, Pa.; Howard Elliot Phillips, Wilmington, Del.

[73] Assignee: E. I. Du Pont de Nemours and Company, Wilmington, Del.

[21] Appl. No.: 647,562

[22] Filed: Jan. 8, 1976

[51] Int. Cl.$^2$ .................. C08G 18/14; C08K 5/02
[52] U.S. Cl. .................. 252/182; 260/2.5 AF
[58] Field of Search .................. 260/2.5 AF; 252/182

[56] References Cited

U.S. PATENT DOCUMENTS

| | | | |
|---|---|---|---|
| 3,072,582 | 1/1963 | Frost | 260/2.5 |
| 3,108,976 | 10/1963 | Knox | 260/2.5 AF |
| 3,183,192 | 5/1965 | Bauer | 252/182 |
| 3,230,185 | 1/1966 | Kopnick | 260/2.5 |
| 3,391,093 | 7/1968 | Frost | 260/2.5 AF |
| 3,405,069 | 10/1968 | Houslay | 252/182 |

Primary Examiner—C. Warren Ivy

[57] ABSTRACT

Preparation of polyurethane foams using 1,1-dichloro-2,2,2-trifluoroethane as a blowing agent eliminates the need for stabilizers in component mixtures.

1 Claim, No Drawings

STORAGE STABILE POLYOL-CHLOROFLUOROALKANE COMPOSITION

BACKGROUND OF THE INVENTION

Polyurethane foams are conventionally prepared by reacting polyols with polyfunctional isocyanates with the use of a chlorofluoroalkane as a blowing agent. It is often desirable to prepare large quantities of the reaction mixture, known as master batches, for the preparation of foamed materials. Certain chlorofluoroalkanes conventionally used as blowing agents, including trichlorofluoromethane, trichlorotrifluoroethanes, and tetrafluorodifluoroethanes, appear to react in part with the primary and secondary polyols to form hydrogen chloride, aldehydes, ketones and other reaction products. These products formed by the reaction of the chlorofluoroalkanes with the polyols adversely effect the properties of the polyurethane foams. Accordingly, it has previously been found desirable to incorporate stabilizers in such mixtures to prevent the reaction of blowing agent and polyurethane precursors. Typical of those stabilizers previously used are those shown in Bauer, U.S. Pat. No. 3,183,192.

While the stabilizers previously used to inhibit undesirable reactions in polyurethane foam precursors have been effective in their intended use, the stabilizers often result in an objectionable odor that persists in the completed foam when rigid foams are prepared.

SUMMARY OF THE INVENTION

The present invention provides an improved process for the preparation of polyurethane foams which eliminates the need for stabilizers previously used in the preparation of such foams.

Specifically, there is provided, in the process for preparing polyurethane foams by reaction of at least one polyol with at least one polyfunctional isocyanate in the presence of a chlorofluoroalkane blowing agent, the improvement wherein the chlorofluoroalkane consists essentially of $CHCl_2CF_3$.

DETAILED DESCRIPTION OF THE INVENTION

The blowing agent used in the instant invention is a known chlorofluorocarbon material, 1,1-dichloro-2,2,2-trifluoroethane. This chlorofluorocarbon is known in the nomenclature conventional to the field as fluorocarbon 123. It can be prepared by known reaction techniques, for example, those shown in McBee et al., Ind. Eng. Chem. 39 409 (1947).

The present process is applicable to the preparation of a wide variety of polyurethane foams, including both rigid and flexible foams. These foams are conventionally prepared by the reaction of organic diisocyanates with polyols. The rigidity of the foam products is generally regulated by the selection of the polyol material. Typical of the foams that can be used in the invention are those shown in U.S. Pat. Nos. 3,072,582, 3,159,591 and 3,298,974.

In many cases, a small amount of water may be added to the polymerizing mixture. The water reacts with isocyanate groups to produce an urea group and a mole of carbon dioxide per mole of water. The carbon dioxide forms a large number of gas cells, thus foaming the polymerizing mass. Blowing agents, such as those of the instant invention, are usually present in liquid form. Under the influence of the heat of polymerization, these blowing agents volatize to gases. Water is generally not used in the preparation of rigid insulating foams.

Catalysts are often used in the preparation of polyurethane foams, including tertiary amines such as triethylene diamine and tin catalysts such as stannous octanoate. Such catalysts are often used in combination to provide a balance of properties and to insure adequate curing of the foam. In addition, silicone surfactants are often added to the mixture of foam components to regulate the cell size in the final foam product.

The blowing agents of the instant invention are used in quantities of about from 1 to 30 parts per 100 parts of polyol when a flexible foam is being prepared, and quantities of about from 15 to 40 parts per 100 parts of polyol when rigid foams are prepared. In general, the present blowing agents are used in substantially the same manner as trichlorofluoromethane, fluorocarbon 11, most typically used in the past. However, the quantity of the present blowing agents used in generally about 11% more than the quantity of fluorocarbon 11 used to give comparable density in the final foam product. In general, the blowing agent is mixed with the reactants in the required proportions, and the mixture poured into a mold of the desired configuration for the formation of the foam. In the preparation of master batches, the blowing agent and other components are usually combined with one of the two basic reactants, and admixed with the second reactant just prior to the preparation of the foam.

The instant invention provides an excellent method of preparing polyurethane foams that exhibits unexpected advantages over previous processes using trichlorofluoromethane. Specifically, the present blowing agents permit the preparation of master batches of polyol and blowing agent having excellent storage stability without the need for the stabilizers previously considered necessary. Thus, the inconvenience and expense of adding the stabilizers to the master mixture is eliminated, as well as the undesirable residual odor often resulting from the stabilizers previously incorporated.

The invention is further illustrated by the following specific examples, in which parts and percentages are by weight unless otherwise indicated.

EXAMPLE 1

A flexible polyurethane foam was prepared using 1,1-dichloro-2,2,2-trifluoroethane as a blowing agent. The following ingredients in the stated porportions were mixed rapidly in a high-speed mixer for 15 seconds:

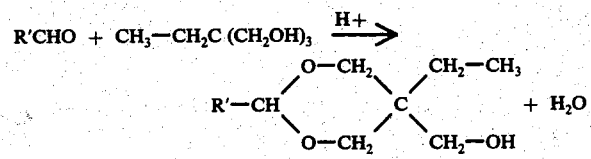

The mixture was quickly poured into an open-top container and allowed to expand.

The foam obtained had a density of 0.022 g cm$^{-3}$; indent load deflection at 65% deflection, according to ASTM Method D1564 (1971) was 227 Newtons per 3.2 dm$^2$.

EXAMPLES 2-3

In Examples 2 and 3, 1,1-dichloro-2,2,2-trifluoroethane was used in the preparation of rigid polyurethane foams employing a polyvinyl polymeric toluene diisocyanate and a polymeric methylene phenylisocyanate, respectively.

A master batch was prepared by mixing the following ingredients in the proportions shown:

|  | Proportion (Wt. %) |
|---|---|
| Polyoxypropylene octol[1] | 73.1 |
| Silicone fluid[2] | 1.1 |
| Triethylenediamine[3] | 1.0 |
| 1,1-dichloro-2,2,2-Trifluoroethane | 24.9 |

[1]Condensation product of propylene oxide and sucrose obtained from Pittsburgh Plate Glass Corp. under the trade name of "Selectrofoam" 6402 and having the properties:

| Hydroxyl number mg KOH/g | 450 |
|---|---|
| Equivalent Weight | 125 |
| Viscosity, Brookfield, 25° C, cps | 30,000 |
| Water content, percent | 0.15 |
| Specific Gravity | 1.15 |

[2]Cell size regulator obtained from Dow-Corning Co. under the trade name Silicone Fluid DC-193, a silicone-glycol copolymer having the properties:

| Viscosity at 25° C, centistokes | 465 |
|---|---|
| Specific Gravity at 25° C | 1.07 |
| Refraction Index, 25° C | 1.4515 |
| Color, Gardner Scale | 2. |

[3]Catalyst.

In Example 2, one part by weight of the master batch was admixed with 0.75 parts of polyvinyl polymeric toluene diisocyanate.* The mixture was poured into a rectangular open-top aluminum panel mold preheated to 50° C. The foam completed its rise in 90 seconds. The finished rigid foam panel had a core density of 0.039 g cm$^{-3}$.

*Obtained from E. I. du Pont de Nemours and Co., Inc. as "Hylene" TRF

| Physical Form | clear, dark brown liquid |
|---|---|
| NCO content | 34.4 ± 0.5 |
| Amine equivalent | 122.2 + 1.8 |
| Viscosity, 25° C, cps | 300–1100 |
| Total Acidity, max. % | 0.04 |
| Specific Gravity 25/4° C | 1.27 ± 0.02. |

In Example 3, one part by weight of the master batch was vigorously mixed for 11 seconds with 0.78 parts of a polymeric methylene phenylisocyanate** and molded as in Example 2. The foam completed its expansion in 80 seconds. The core density of the rigid foam was 0.034 g cm$^{-3}$.

**Prepared by phosgenation of aniline-formaldehyde condensation product and obtained from the Mobay Corp. as "Mondur" MR.

EXAMPLE 4 AND COMPARATIVE EXAMPLE A

Simultaing commercial practice, 70 parts by weight of a basic polyether polyol[1] was mixed with 30 parts by weight of 1,1-dichloro-2,2,2-trifluoroethane and the mixture was placed in a closed tin-plated can. After accelerated 10-week storage at 55° C, a representative sample of the mixture was titrated with standard aqueous potassium hydroxide to phenolphthalein endpoint. Per gram of mixture 0.95 mg of KOH was consumed. The mixture performed normally in the preparation of foamed polyurethane foam therefrom.

[1]Obtained from Jefferson Chemical Co. under the trademark "Thanol" R-350X.

| Hydroxy number, mg KOH/g | 520–540 |
|---|---|
| Equivalent weight | 106 |
| Viscosity, 25° C, cps | 12,000–17,000 |
| Water content, percent | 0.1 |
| Specific Gravity, 20°/20° | 1.116. |

In Comparative Example A, the procedure of Example 4 was repeated, except that trichlorofluoromethane was used instead of $CHCl_2CF_3$. After storage, the trichlorofluoromethane underwent decomposition requiring 7.5 mg of KOH per gram of mixture. The mixture was black and polyurethane foam could not be prepared therefrom.

We claim:

1. A mixture comprising polyol suitable for polyurethane foam preparation and about from 1 to 40 parts by weight per 100 parts by weight of polyol, of $CHCl_2CF_3$.

* * * * *

UNITED STATES PATENT AND TRADEMARK OFFICE
CERTIFICATE OF CORRECTION

PATENT NO. : 4,076,644
DATED : February 28, 1978
INVENTOR(S) : James Gordon Burt and Howard Elliot Phillips It is certified that error appears in the above—identified patent and that said Letters Patent is hereby corrected as shown below:

Delete in its entirety the chemical reaction which appears in Column 2, lines 55 through 62.

Insert the following in place of the deleted chemical reaction:

|  | Proportion (Wt. %) |
|---|---|
| -- Polyether triol$^{(1)}$ | 61.65 |
| Silicone fluid$^{(2)}$ | 0.62 |
| Triethylenediamine$^{(3)}$ | 0.09 |
| Water | 2.16 |
| Stannous octanoate$^{(3)}$ | 0.28 |
| 1,1-Dichloro-2,2,2-trifluoroethane | 6.84 |
| Toluene diisocyanate | 28.36 |

$^{(1)}$ A polyoxypropylene triol based on trimethylolpropane having a number average mol. wt. of 3,000, obtained from Dow Chemical Co. as "Voranol" 3000.
$^{(2)}$ For regulating cell size, obtained from Dow-Corning Co. as Silicone Fluid DC-190.
$^{(3)}$ Catalyst. --

Signed and Sealed this

Third Day of October, 1989

Attest:

DONALD J. QUIGG

Attesting Officer

Commissioner of Patents and Trademarks